(12) United States Patent
Akula et al.

(10) Patent No.: US 12,210,833 B2
(45) Date of Patent: Jan. 28, 2025

(54) SYSTEM OF AND METHOD FOR AUTOMATICALLY DETECTING SARCASM OF A BATCH OF TEXT

(71) Applicant: University of Central Florida Research Foundation, Inc., Orlando, FL (US)

(72) Inventors: Ramya Akula, Orlando, FL (US); Ivan Garibay, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 353 days.

(21) Appl. No.: 17/851,851

(22) Filed: Jun. 28, 2022

(65) Prior Publication Data
US 2023/0073602 A1    Mar. 9, 2023

Related U.S. Application Data

(60) Provisional application No. 63/260,477, filed on Aug. 20, 2021.

(51) Int. Cl.
| | |
|---|---|
| *G10L 15/08* | (2006.01) |
| *G06F 40/284* | (2020.01) |
| *G06F 40/30* | (2020.01) |

(52) U.S. Cl.
CPC ............ *G06F 40/30* (2020.01); *G06F 40/284* (2020.01)

(58) Field of Classification Search
CPC ...... G06F 40/30; G06F 40/284; G06F 40/253; G06F 18/214; G06F 16/908; G10L 15/16; G10L 25/48

USPC ............................................................ 704/9
See application file for complete search history.

(56) References Cited

U.S. PATENT DOCUMENTS

| | | | |
|---|---|---|---|
| 2019/0050716 A1* | 2/2019 | Barkan | G10L 25/48 |
| 2020/0041419 A1* | 2/2020 | Pollak | G06F 16/908 |
| 2021/0050001 A1* | 2/2021 | Chen | G10L 15/16 |
| 2023/0136632 A1* | 5/2023 | Tsingos | G06F 18/214 |
| | | | 386/241 |

OTHER PUBLICATIONS

S.G Shamay-Tsoory et al. "The Neuroanatomical Basis of Understanding Sarcasm and Its Relationship to Social Cognition" 2005, vol. 19, No. 3, 288-300.

(Continued)

*Primary Examiner* — Md S Elahee
(74) *Attorney, Agent, or Firm* — Owen G. Behrens; Smith & Hopen, P.A.

(57) ABSTRACT

Described, herein, relates to a system and method of accurately and efficiently detecting a tone of a batch of text that achieves both high performance and interpretability by leveraging a multi-head self-attention architecture. The presence of a tone in a batch of text provides a challenge to the performance of a sentiment analysis, since there is an inherent ambiguity in sarcastic expressions that makes sarcasm detection difficult through purely text-based interactions. As such, the multi-head self-attention architecture includes distinct components of routing data through modules comprising data pre-processing, multi-head self-attention, gated recurrent units, and classification, resulting in a modeling system with improved interpretability and accuracy.

20 Claims, 8 Drawing Sheets

(56) References Cited

OTHER PUBLICATIONS

Stephen Skalicky et al. "Linguistic Features of Sarcasm and Metaphor Production Quality" Jun. 6, 2018. pp. 7-16 New Orleans, Louisiana.
Roger J. Kreuz. et al. "Lexical Influences on the Perception of Sarcasm" Apr. 26, 2007, pp. 1-4. Association for Computational Linguistics. Rochester, NY.
Aditya Joshi et al. "Harnessing Context Incongruity for Sarcasm Detection" Jul. 26-31, 2015. pp. 757-762. Association for Computational Linguistics. Beijing, China.
Aniruddha Ghosh et al. "Magnets for Sarcasm: Making Sarcasm Detection Timely, Contextual and Very Personal" Sep. 7-11, 2017. pp. 482-491. Association for Computational Linguistics. Copenhagen, Denmark.
Suzana Ili'c et al. "Deep contextualized word representations for detecting sarcasm and irony" Oct. 31, 2018. pp. 2-7, Association for Computational Linguistics.Brussels, Belgium.
Debanjan Ghosh et al. "Sarcasm Analysis Using Conversation Context" Aug. 20, 2018, pp. 765-792. vol. 44, No. 4. Association for Computational Linguistics.
Tao Xiong et al. "Sarcasm Detection with Self-matching Networks and Low-rank Bilinear Pooling" May 13-17, 2019. pp. 2115-2124. (International World Wide Web Conference Committee), published under Creative Commons CC-BY 4.0 License. San Francisco, California.
Liyuan Liu et al. "A2Text—Net: A Novel Deep Neural Network for Sarcasm Detection" Dec. 2019, DOI: 10.1109/CogMI48466.2019.00025.
Paula Carvalho et al. "Clues for Detecting Irony in User-Generated Contents: Oh . . . !! It's "so easy" ;-)" TSA'09, Nov. 6, 2009, pp. 1-5. Hong Kong, China.
Roberto González-Ibáñez et al. "Identifying Sarcasm in Twitter: A Closer Look" Jun. 19-24, 2011, pp. 581-586. Association for Computational Linguistics, Portland, Oregon.
Oren Tsur et al. "A Great Catchy Name: Semi-Supervised Recognition of Sarcastic Sentences in Online Product Reviews" 2010, pp. 162-179. Association for the Advancement of Artificial Intelligence (www.aaai.org).
Dmitry Davidov et al. "Semi-Supervised Recognition of Sarcastic Sentences in Twitter and Amazon" Jul. 15-16, 2010. pp. 107-116, Association for Computational Linguistics. Uppsala, Sweden.
Ellen Riloff et al. "Sarcasm as Contrast between a Positive Sentiment and Negative Situation" Oct. 18-21, 2013. pp. 704-714, Association for Computational Linguistics. Seattle, Washington.
Byron C. Wallace et al. "Sparse, Contextually Informed Models for Irony Detection: Exploiting User Communities, Entities and Sentiment" Jul. 26-31, 2015. pp. 1035-1044, Association for Computational Linguistics. Beijing, China.
Soujanya Poria et al. "A Deeper Look into Sarcastic Tweets Using Deep Convolutional Neural Networks" Dec. 11-17, 2016. pp. 1601-1612, The 26th International Conference on Computational Linguistics: Technical Papers. Osaka, Japan.
Silvio Amir et al. "Modelling Context with User Embeddings for Sarcasm Detection in Social Media" Aug. 7-12, 2016 pp. 167-177, Association for Computational Linguistics. Berlin, Germany.
Devamanyu Hazarika et al. "CASCADE: Contextual Sarcasm Detection in Online Discussion Forums" Aug. 20-26, 2018. pp. 1837-1848, Proceedings of the 27th International Conference on Computational Linguistics. Santa Fe, New Mexico, USA.
Ashwin Rajadesingan et al. "Sarcasm Detection on Twitter: A Behavioral Modeling Approach" Feb. 2-6, 2015, pp. 97-106. Shanghai, China.
Meishan Zhang "Tweet Sarcasm Detection Using Deep Neural Network" Dec. 11-17, 2016. pp. 2449-2460, Proceedings of COLING 2016, the 26th International Conference on Computational Linguistics: Technical Papers. Osaka, Japan.
Tomas Ptacek et al. "Sarcasm Detection on Czech and English Twitter" Aug. 23-29, 2014, pp. 213-223. Proceedings of COLING 2014, the 25th International Conference on Computational Linguistics: Technical Papers, Dublin, Ireland.
Zelin Wang et al. "Twitter Sarcasm Detection Exploiting a Context-Based Model" 2015, pp. 77-91. Springer International Publishing Switzerland.
Joshi, A. et al., Harnessingسequence labeling for sarcasm detection in dialogue from tv series 'friends'. In Proceedings of the 20th SIGNLL Conference on Computational Natural Language Learning, Berlin, Germany, Aug. 11-12, 2016; pp. 146-155.
Aniruddha Ghosh et al. "Fracking Sarcasm using Neural Network" Jun. 12-17, 2016, pp. 161-169. Association for Computational Linguistics. San Diego, California.
Ashish Vaswani et al. "Attention Is All You Need" 2017, 31st Conference on Neural Information Processing Systems. 31st Conference on Neural Information Processing Systems. Long Beach, CA, USA.
Thomas Wolf et al. "Transformers: State-of-the-Art Natural Language Processing" Nov. 16-20, 2020, pp. 38-45, Association for Computational Linguistics.
Tomas Mikolov et al. "Efficient Estimation of Word Representations in Vector Space" Sep. 7, 2013. pp. 1-12.
Tomas Mikolov et al. "Distributed Representations of Words and Phrases and their Compositionality" In Proceedings of the Advances in Neural Information Processing Systems, Lake Tahoe, NV, USA, Dec. 5-10, 2013; pp. 3111-3119. code.google.com/p/word2vec/source/browse/trunk/questions-words.txt.
Jeffrey Pennington et al. "GloVe: Global Vectors for Word Representation" Oct. 25-29, 2014. pp. 1532-1543, Proceedings of the 2014 Conference on Empirical Methods in Natural Language Processing (EMNLP), Doha, Qatar.
Armand Joulin et al. "Bag of Tricks for Efficient Text Classification" Apr. 3-7, 2017, pp. 427-431, vol. 2, Short Papers.Proceedings of the 15th Conference of the European Chapter of the Association for Computational Linguistics. Valencia, Spain.
Matthew E. Peters et al. "Deep contextualized word representations" Jun. 1-6, 2018. pp. 2227-2237, Proceedings of NAACL-HLT. New Orleans, Louisiana.
Jacob Devlin et al. "BERT: Pre-training of Deep Bidirectional Transformers for Language Understanding" Jun. 2-Jun. 7, 2019. pp. 4171-4186. Proceedings of NAACL-HLT, Minneapolis, Minnesota.
Bolei Zhou et al. "Learning Deep Features for Discriminative Localization" In Proceedings of the IEEE Conference on Computer Vision and Pattern Recognition, Las Vegas, NV, USA, Jun. 27-30, 2016, pp. 12921-2929, http://cnnlocalization.csail.mit.edu.
Ramprasaath R. Selvaraju et al. "Grad-CAM: Visual Explanations from Deep Networks via Gradient-based Localization". In Proceedings of the IEEE International Conference on Computer Vision, Venice, Italy, Oct. 22-29, 2017, pp. 618-626, https://github.com/karpathy/neuraltalk2.
Shereen Oraby et al. "Creating and Characterizing a Diverse Corpus of Sarcasm in Dialogue" Sep. 13-15, 2016. pp. 31-41, Proceedings of the SIGDIAL 2016 Conference, Association for Computational Linguistics. Los Angeles, USA.
Marilyn A. Walker et al. "A Corpus for Research on Deliberation and Debate" In Proceedings of the LREC, Istanbul, Turkey, May 23-25, 2012, pp. 812-817.
Mikhail Khodak et al. "A Large Self-Annotated Corpus for Sarcasm" In Proceedings of the Eleventh International Conference on Language Resources and Evaluation (LREC 2018), Miyazaki, Japan, May 7-12, 2018. pp. 641-646.
Rishabh Misra et al. "Sarcasm Detection using Hybrid Neural Network" arXiv 2019, arXiv:1908.07414.
Adam Paszke et al. "PyTorch: An Imperative Style, High-Performance Deep Learning Library" 2019, pp. 1-12. 33rd Conference on Neural Information Processing Systems. Vancouver, Canada.
Hernandez Farias et al. "Irony Detection in Twitter: The Role of Affective Content" Jan. 2016, pp. 1-25. vol. 16, ACM Transactions on Internet Technology.
Yi Tay et al. "Reasoning with Sarcasm by Reading In-between" Jul. 15-20, 2018, pp. 1010-1020. Proceedings of the 56th Annual Meeting of the Association for Computational Linguistics (Long Papers),Melbourne, Australia.
Kevin Clark et al. "What does BERT look at? An Analysis of BERT's Attention" Aug. 1, 2019. pp. 276-286, Proceedings of the

(56) References Cited

OTHER PUBLICATIONS

Second BlackboxNLP Workshop on Analyzing and Interpreting Neural Networks for NLP. Florence, Italy.
Oscar Bark et al. "A deep learning approach for identifying sarcasm in text" 2017, pp. 1-67. Chalmers University of Technology Gothenburg, Sweden.
Yitao Cai et al. "Multi-Modal Sarcasm Detection in Twitter with Hierarchical Fusion Model" Aug. 2, 2019. pp. 2506-2515, Proceedings of the 57th Annual Meeting of the Association for Computational Linguistic. Florence, Italy.
Yu-Hsiang Huang et al. "Irony Detection with Attentive Recurrent Neural Networks" 2017, pp. 534-540. Irony Detection with Attentive Recurrent Neural Networks.
Pulkit Mehndiratta et al. "Detection of Sarcasm in Text Data Using Deep Convolutional Neural Networks" Apr. 2018, pp. 219-228. vol. 18, No. 3. Scalable Computing: Practice and Experience.

\* cited by examiner

Sarcastic

| | Prediction |
|---|---|
| ya sure i agree you are totally innocent and this is your first warning | 0.928 |
| this could never happen naturally , it clear indication of obvious troll ! | 0.915 |
| well yeah i guess you didn't i even get into the war until it was basically already over ! | 0.901 |

Non-Sarcastic

| | Prediction |
|---|---|
| as a democrat i must say his first 100 days are a success . | 0.185 |
| one of the lost vikings | 0.295 |
| commented just to make it 322 | 0.384 |

*FIG. 7*

SYSTEM OF AND METHOD FOR AUTOMATICALLY DETECTING SARCASM OF A BATCH OF TEXT

CROSS-REFERENCE TO RELATED APPLICATIONS

This nonprovisional application claims the benefit of U.S. Provisional Application No. 63/260,477 entitled "INTERPRETABLE MULTI-HEAD SELF-ATTENTION ARCHITECTURE FOR SARCASM DETECTION," filed Aug. 20, 2021 by the same inventors, all of which is incorporated herein by reference in its entirety.

FEDERALLY SPONSORED RESEARCH OR DEVELOPMENT

This invention was made with Government support under Grant No. FA8650-18-C-7823 awarded by the Defense Advanced Research Projects Agency. The government has certain rights in the invention.

BACKGROUND OF THE INVENTION

1. Field of the Invention

This invention relates, generally, to interpretable models of predicting lexical and contextual interpretations using self-attention architectures. More specifically, it relates to a system and method of automatically detecting a tone of a batch of text of an application, such as a social media program, by leveraging a multi-head self-attention architecture.

2. Brief Description of the Prior Art

As society continues to operate within a digital landscape, with an increasing percentage of the world's population having access to an online infrastructure, online publications by individuals plays a very important role in the lives of both individuals and businesses. For example, businesses often require a digital presence to advertise their products, build brand value, and reach out to their customers, since more traditional analog business practices are becoming rarer. Similarly, by providing publication access to each individual having an online presence, an online post from a single person can have a profound impact not only on other individuals, but also on business. For example, businesses often derive their reputation from online reviews posted by consumers, and businesses are increasing turning to digital chat-based platforms for providing customer service. A bad review received from an individual consumer or a poor interaction during a troubleshooting conversation can result in a negative view of a particular company, which can have devastating economic impacts on the business and those associated therewith.

To leverage these online publication platforms, such as social media and discussion forums, it is important for businesses to receive and process customer feedback prior to engaging with the posting individual. One such form of processing involves performing a sentiment analysis to identify the emotion, either positive, negative, or neutral, associated with an online publication. By performing such a sentiment analysis, a business can ensure an appropriate reply by gauging an emotion of the poster. However, the presence of sarcasm in a string of text provides a challenge to the performance of a sentiment analysis. As a linguistic expression, sarcasm is often used to communicate the opposite of what is said, usually something that is very unpleasant, with an intention to insult or ridicule. During a face-to-face interaction, sarcasm can typically be identified by analyzing the facial expressions, gestures, and tone of the speaker. However, there is an inherent ambiguity in sarcastic expressions that makes sarcasm detection very difficult through purely text-based interactions.

The topic of sarcasm has previously received great interest from Neuropsychology to Linguistics but developing automated computational models for automatic detection of sarcasm, which would be highly beneficial for the quick and efficient detection of sarcasm by online businesses receiving vast amounts of communications, is still at its nascent phase. Previous attempts at performing sarcasm detection on batches of text use lexical (content) and pragmatic (context) cues, such as interjections, punctuations, and sentimental shifts within the texts, which are major indicators of sarcasm. In these attempts, the features for review are hand-crafted and custom-designed for a particular batch of text, and therefore cannot generalize in the presence of informal language and figurative slang that is widely used in online conversations. For example, previously attempts use hand-crafted features such as Bag of Words (BoW), Parts of Speech (POS), and sentiment/emotions to train their classifiers. These hand-crafted features are easily interpretable by subsequent users to classify different datasets; however, they lack high performance capable my more complex models, such as deep learning-based models.

More recently, with the advent of deep-learning, attempts have been made to leverage neural networks to learn both lexical and contextual features, eliminating the need for hand-crafted features to analyze and predict batches of text. In these attempts, the at least one aspect embedding may be incorporated to train deep convolutional, recurrent, or attention-based neural networks to achieve improved predictive results on multiple large-scale datasets. While these deep learning-based approaches have been shown to achieve impressive performance, they lack interpretability for the analysis of subsequent datasets, since it may not be evident which data points the approaches considered and which data points received a lower weight.

Regardless of whether a work utilizes the more traditional hand-crafted models or the more recent deep learning-based models, most text-based models attempt to classify based on either content or context, as discussed above. For content-based approaches, lexical and linguistic cues (interjections, emoticons, and quotation marks), as well as syntactic patterns, are used to train classifiers for sarcasm detection. In addition, the use of positive utterance in a negative context is used as a reliable feature to detect sarcasm by some works. Linguistic features, such as implicit and explicit context incongruity, are used in other works. In these attempts, only the input text is used to detect sarcasm without any context information.

For context-based approaches, which increased in popularity in the recent past with the emergence of various online social networking platforms, the surrounding words in a text string are taken into consideration to compensate for the grammatical errors and extensive usage of slang that are common online. For example, some attempts detected sarcasm using sentiment and emotional information from the input text as contextual information. Other attempts use personality features of the user as context, while additional works use historical posts of the user to incorporate sarcastic tendencies.

While previous attempts at accurately and consistently classifying a tone in a batch of text have improved over the years, the existing models either lack sufficient performance or interpretability for subsequent modeling projects. Accordingly, what is needed is a comprehensive approach to modeling batches of text to accurately and efficiently predict the tone within the text that achieves both high performance and interpretability by leveraging a multi-head self-attention architecture. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need for a method of detecting a tone within a batch of text using a multi-head self-attention model is now met by a new, useful, and nonobvious invention.

The present disclosure pertains to a method of automatically predicting a tone of a batch of text of an application associated with a computing device. In an embodiment, the method may comprise the steps of: (a) loading, into a memory of the computing device, the application; receiving, via the application of the computing device, the batch of text; (b) converting, via a processor of the computing device, the batch of text into at least one aspect embedding; (c) transmitting, via the processor of the computing device, the at least one aspect embedding to at least one multi-head self-attention module, where the at least one multi-head self-attention module may comprise a tokenizer, such that the tokenizer may be configured to transform the at least one aspect embedding into at least one dimensional embedding; (d) computing at least one self-attention value, via the at least one multi-head self-attention module, such that the at least one multi-head self-attention module may be configured to associate at least one dimensional embedding with sarcasm; (e) transmitting, via the processor of the computing device, the at least one self-attention value to a gated recurrent unit ("GRU"), such that the gated recurrent unit may be configured to compute a sarcasm output from the at least one self-attention value; (f) transmitting, via the processor of the computing device, the sarcasm output to a classification module, such that the classification module may be configured to compute an initial tone prediction from the sarcasm output; (g) comparing, via the classification module, the initial tone prediction with a ground-truth label; and (h) automatically displaying the tone of the batch of text on a display device associated with the computing device by: (1) based on a determination that the initial tone prediction does not match the ground-truth label, generating a notification indicative of sarcasm within the batch of text; and (2) based on a determination that the initial tone prediction matches the ground-truth label, generating a notification indicative of no sarcasm within the batch of text.

In an embodiment, the method may further include the step of, after automatically displaying the tone of the batch of text on the display device associated with the computing device, displaying the batch of text with at least one aspect embedding indicative of sarcasm highlighted. Additionally in this embodiment, the highlight on the at least one aspect embedding indicative of sarcasm may be darker than the at least one alternative aspect embedding within the batch of text.

In some embodiments, the method may further include the step of, after automatically displaying the tone of the batch of text on the display device associated with the computing device, receiving an instruction to unload, from the memory of the computing device, the batch of text. Additionally, in this other embodiment, the step of automatically displaying tone of the batch of text on the display device associated with the computing device, may further include the step of, after receiving the instruction to unload the batch of text, receiving at least one alternative batch of text, via the application. Furthermore, the application may be a social media program and/or any program known in the art which may comprise a text that may be configured to convey a tone of a user. In some embodiments, the method may further include the step of, after receiving the batch of text, selecting the at least one aspect embedding from a group including but not limited to "just," "again," "totally," and exclamation points.

Another aspect of the present disclosure pertains to a tone analysis optimization system for automatically displaying a tone of a batch of text of an application associated with a computing device. In an embodiment, the tone analysis optimization system may comprise the following: (a) the computing device having a processor; and (b) a non-transitory computer-readable medium operably coupled to the processor, the computer-readable medium having computer-readable instructions stored thereon that, when executed by the processor, may cause the tone analysis optimization system to automatically display the tone of a batch of text of the application associated with the computing device by executing instructions comprising: (1) loading, into a memory of the computing device, the application; (2) receiving, via the application of the computing device, the batch of text; (3) converting, via a processor of the computing device, the batch of text into at least one aspect embedding; (4) transmitting, via the processor of the computing device, the at least one aspect embedding to at least one multi-head self-attention module, where the at least one multi-head self-attention module may comprise a tokenizer, such that the tokenizer may be configured to transform the at least one aspect embedding into at least one dimensional embedding; (5) computing at least one self-attention value, via the at least one multi-head self-attention module, such that the at least one multi-head self-attention module may be configured to associate at least one dimensional embedding with sarcasm; (6) transmitting, via the processor of the computing device, the at least one self-attention value to a gated recurrent unit ("GRU"), such that the gated recurrent unit may be configured to compute a sarcasm output from the at least one self-attention value; (7) transmitting, via the processor of the computing device, the sarcasm output to a classification module, such that the classification module may be configured to compute an initial tone prediction from the sarcasm output; (8) comparing, via the classification module, the initial tone prediction with a ground-truth label; and (9) automatically displaying the tone of the batch of text on a display device associated with the computing device by: (i) based on a determination that the initial tone prediction does not match the ground-truth label, generating a notification indicative of sarcasm within the batch of text; and (ii) based on a determination that the initial tone prediction matches the ground-truth label, generating a notification indicative of no sarcasm within the batch of text.

In some embodiments, the executed instructions may further comprise, after automatically displaying the tone of the batch of text on the display device associated with the computing device, displaying the batch of text with at least one aspect embedding indicative of sarcasm highlighted. Additionally, the highlight on the at least one aspect embedding indicative of sarcasm may be darker than the at least one alternative aspect embedding within the batch of text.

In some embodiments, the executed instructions may further comprise, after automatically displaying the tone of the batch of text on the display device associated with the computing device, receiving an instruction to unload, from the memory of the computing device, the batch of text. Moreover, the executed instructions may further include, after automatically displaying the tone of the batch of text and receiving the instruction to unload the batch of text, receiving at least one alternative batch of text, via the application. As such, the executed instructions may further include, after receiving the batch of text, selecting the at least one aspect embedding from a group including but not limited to "just," "again," "totally," and exclamation points.

Furthermore, another aspect of the present disclosure pertains to a method of automatically determining a tone of a batch of text of an application associated with a computing device. In an embodiment, the method may comprise the steps of: (a) loading, into a memory of the computing device, the application; (b) receiving, via the application of the computing device, the batch of text; (c) converting, via a processor of the computing device, the batch of text into at least one aspect embedding; (d) transmitting, via the processor of the computing device, the at least one aspect embedding to at least one multi-head self-attention module, where the at least one multi-head self-attention module comprising a tokenizer, such that the tokenizer may be configured to transform the at least one aspect embedding into at least one dimensional embedding; (e) computing at least one self-attention value, via the at least one multi-head self-attention module, such that the at least one multi-head self-attention module may be configured to associate at least one dimensional embedding with sarcasm; (f) transmitting, via the processor of the computing device, the at least one self-attention value to a gated recurrent unit ("GRU"), such that the gated recurrent unit may be configured to compute a sarcasm output from the at least one self-attention value; (g) transmitting, via the processor of the computing device, the sarcasm output to a classification module, such that the classification module may be configured to compute an initial tone prediction from the sarcasm output; comparing, via the classification module, the initial tone prediction with a ground-truth label; and (h) automatically displaying the tone of the batch of text on a display device associated with the computing device by: (1) based on a determination that the initial tone prediction does not match the ground-truth label, generating a notification indicative of sarcasm within the batch of text; and (2) based on a determination that the initial tone prediction matches the ground-truth label, generating a notification indicative of no sarcasm within the batch of text.

In an embodiment, the method may further include the steps of: (i) after automatically displaying the tone of the batch of text on the display device associated with the computing device, receiving an instruction to unload, from the memory of the computing device, the batch of text; (ii) based on a determination that the initial tone prediction does not match the ground-truth label, after receiving the instruction to unload the batch of text, receiving at least one alternative batch of text, via the application; and (iii) based on a determination that the initial tone prediction matches the ground-truth label, after receiving the instruction to unload the batch of text, receiving at least one alternative batch of text, via the application.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 7 depicts a sarcastic and non-sarcastic attention analyses including predictive results for sample batch of text, according to an embodiment of the present disclosure.

DETAILED DESCRIPTION OF THE INVENTION

Figure 1:
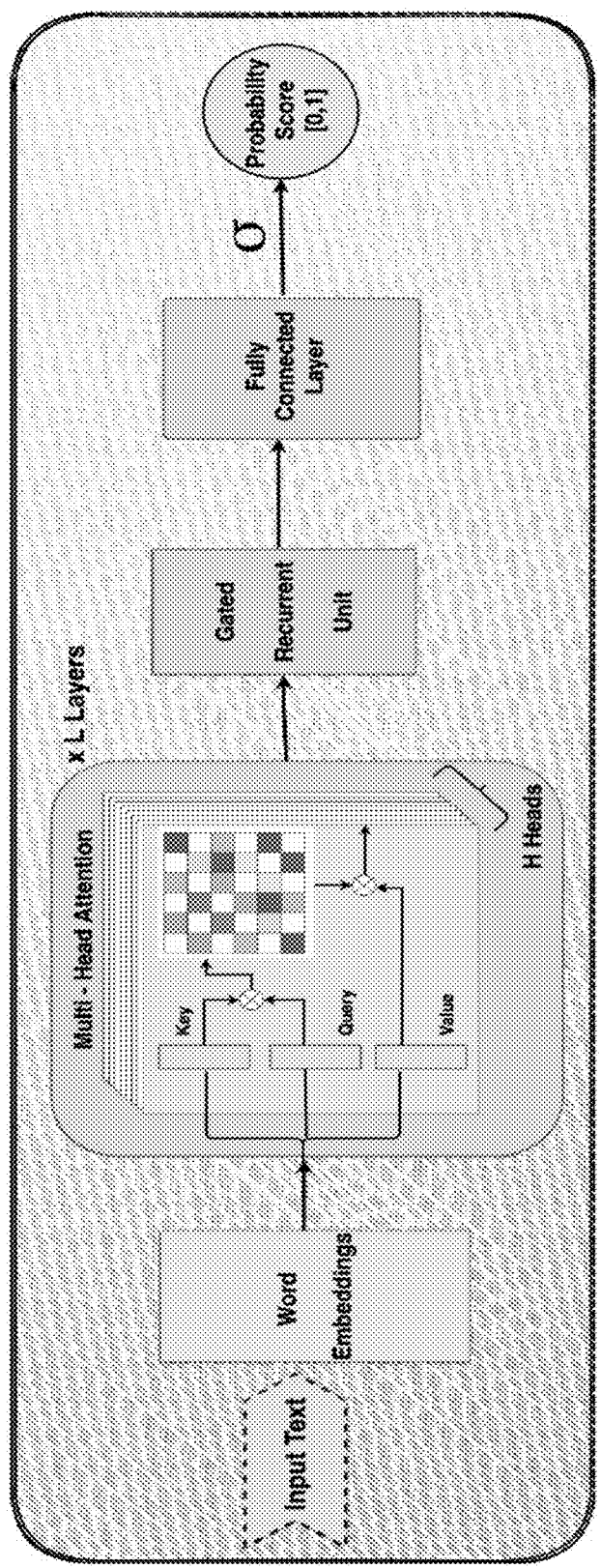
FIG. 1 depicts a multi-head self-attention architecture, according to an embodiment of the present disclosure.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention. Elements/components shown in diagrams are illustrative of exemplary embodiments of the disclosure and are meant to avoid obscuring the disclosure. Any headings, used herein, are for organizational purposes only and shall not be used to limit the scope of the description or the claims. Furthermore, the use of certain terms in various places in the specification of for illustration and should not be construed as limiting.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items. Definitions:

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

As used herein, the term, "computer readable medium," may refer to a computer readable signal medium or a computer readable storage medium.

As used herein, the term, "computer readable storage medium" may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

As used herein, the term, "computer readable signal medium," may include a propagated data signal with computer readable program PIN embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program PIN embodied on a computer readable medium may be transmitted using any appropriate medium, including but not limited to wireless, wire-line, optical fiber cable, radio frequency, etc., or any suitable combination of the foregoing. Computer program PIN for carrying out operations for aspects of the present invention may be written in any combination of one or more programming languages, including an object oriented programming language such as Java, C#, C++ or the like and conventional procedural programming languages, such as the "C" programming language or similar programming languages.

Aspects of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, computing device, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, "about" means approximately or nearly and in the context of a numerical value or range set forth means ±15% of the numerical.

As used herein, the term "application" may refer to any program known in the art which may comprise a text that may be configured to convey a tone of a user. For ease of reference, the exemplary embodiment described herein refers to a social media program, but this description should not be interpreted as exclusionary of other programs.

As used herein, the term "text" may refer to a word, emoji, emoticon, gif, image, video, and/or any content known in the art which may convey a tone. For ease of reference, the exemplary embodiment described herein refers to a word, but this description should not be interpreted as exclusionary of other content.

As used herein, the term "aspect embedding" may refer to a word, emoji, emoticon, and/or any text known in the art which may convey sarcasm of a batch of text. For ease of reference, the exemplary embodiment described herein refers to a word, but this description should not be interpreted as exclusionary of other texts.

As used herein, the term "attention module" may refer to a mechanism to discover patterns in the input that are crucial for solving the given task.

As used herein, the term "self-attention module" may refer to an attention module and mechanism for sequences which helps learn the task-specific relationship between different elements of a given sequence to produce a better sequence representation.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the structures described herein are merely exemplary and that equivalents of such are known in the art and can be substituted for the structures explicitly stated herein.

Wherever the term "at least," "greater than," or "greater than or equal to" precedes the first numerical value in a series of one or more numerical values, the term "at least,"

"greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of one or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Sarcasm Detection:

The present disclosure pertains to a system and a method of automatically detecting a tone of a batch of text of an application, such as a social media program, by leveraging a multi-head self-attention architecture. In an embodiment, as shown in FIG. 1, the system architecture may include distinct components of routing data through modules comprising data pre-processing, multi-head self-attention, gated recurrent units (hereinafter "GRU"), and classification, resulting in a modeling system with improved interpretability and accuracy. Accordingly, developing models that can explain their predictions (with high interpretability) is crucial to understanding and extending use of deep learning models, enabling a wide range of applications with machine intelligence at its backbone. Existing deep learning network architectures, such as convolutional and recurrent neural networks, are not inherently interpretable and require additional visualization techniques. To avoid this, inherently interpretable self-attention modules are applied that allows the identification of elements in the input that are crucial for a given task.

As such, the present invention includes a system and method of automatically detecting a tone of a batch of text within an application. Accordingly, the detection of the tone of the batch of text of the application is automatically optimized, such that, based on a score provided, the batch of text is automatically displayed as either indicative of sarcasm and/or non-sarcasm. The system and method will be described in greater detail in the sections herein below.

As shown in FIG. 1, in an embodiment, during the initial pre-processing step, a server converts a batch of text into at least one aspect embedding, which are used to train a deep learning model. Additionally, in this embodiment, a tokenizer may be applied to convert at least one aspect embedding into a dimensional embedding. Accordingly, in some embodiments, a pre-trained language module may also be applied to convert at least one aspect embedding into the at least one dimensional embedding. In this embodiments, the at least one dimensional embedding may form the input to the multi-head self-attention module, which in some embodiment, may identify at least one aspect embedding in the batch of text that indicates the presence or absence of sarcasm. In this embodiment, after routing through the multi-head self-attention module, in an embodiment, the GRU layer may aid in learning long-distance relationships among the words highlighted by the multi-head self-attention module. The GRU layer may create a sarcasm output, such that the sarcasm output may encode an entire sequence. Moreover, in some embodiments, the sarcasm output may then be used in a fully-connected layer with sigmoid activation in order to obtain the final sarcasm score, such that a presence of sarcasm is detected. Finally, the final sarcasm score may be transmitted to a classification module, via a processor. In an embodiment, the sarcasm output may then be converted into an initial tone prediction via the classification module. In this embodiment, the initial tone prediction may comprise a binary structure (e.g., [0,1]). As such, the classification module may then be configured to compare the initial tone prediction with a ground-truth label. In this embodiment, the classification module may comprise the ground-truth label. Accordingly, the ground-ruth label may also comprise a binary structure (e.g., [0,1]). In this embodiment, after the classification module compares the initial tone prediction with the ground-truth label, a final tone score may be computed, such that the final tone score may comprise a binary structure (e.g., [0,1]), such that 0=No Sarcasm, and 1=Sarcasm. In some embodiments, the initial tone prediction, the ground-truth label, and/or the final tone score may comprise standardized digits and probability metrics. Accordingly, each module and step will be described herein below in greater detail.

Figure 2:
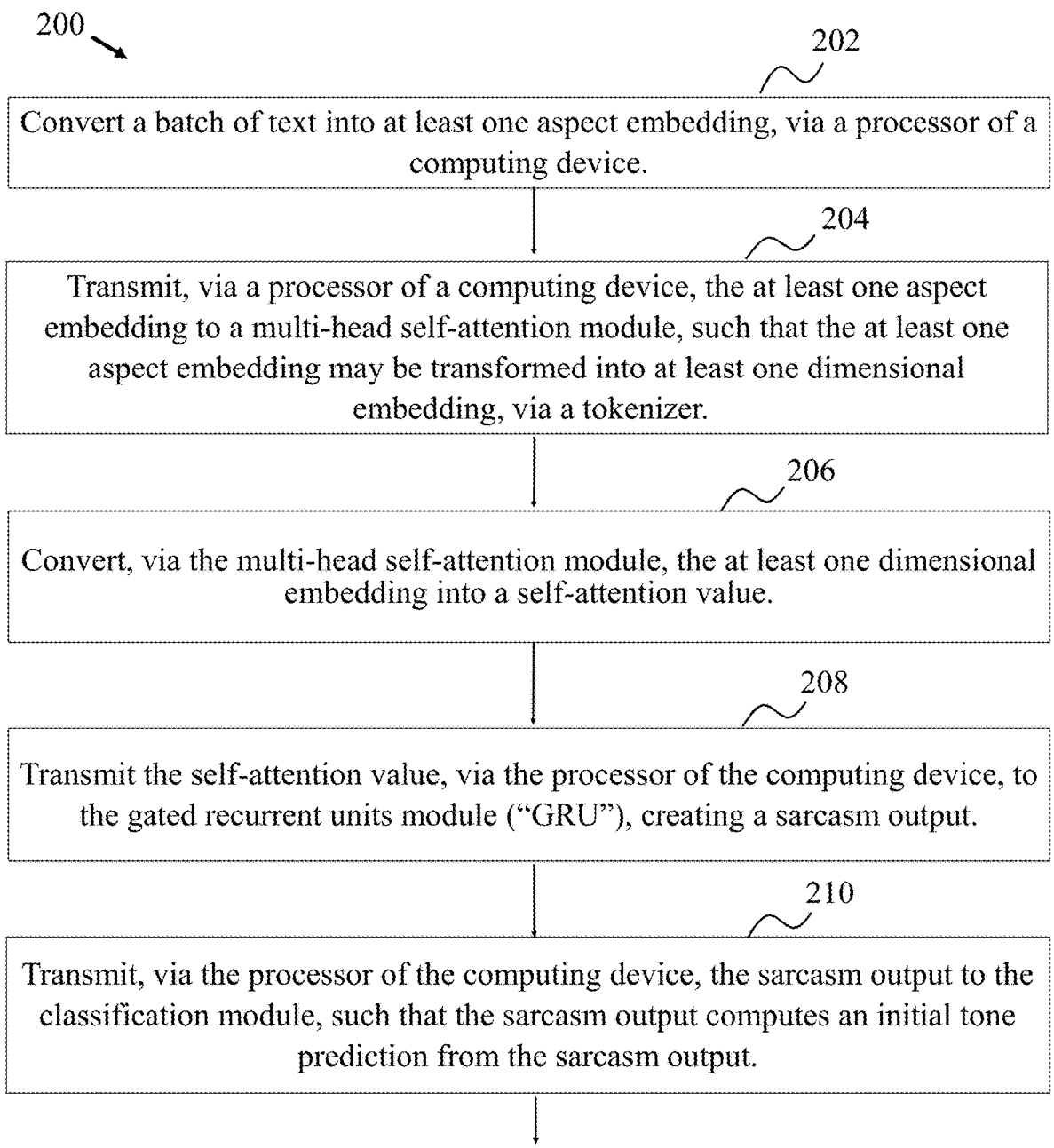
FIG. 2 depicts an exemplary process flow diagram depicting a method of detecting a presence of sarcasm within a batch of text of an application, according to an embodiment of the present disclosure.
Figure 2:
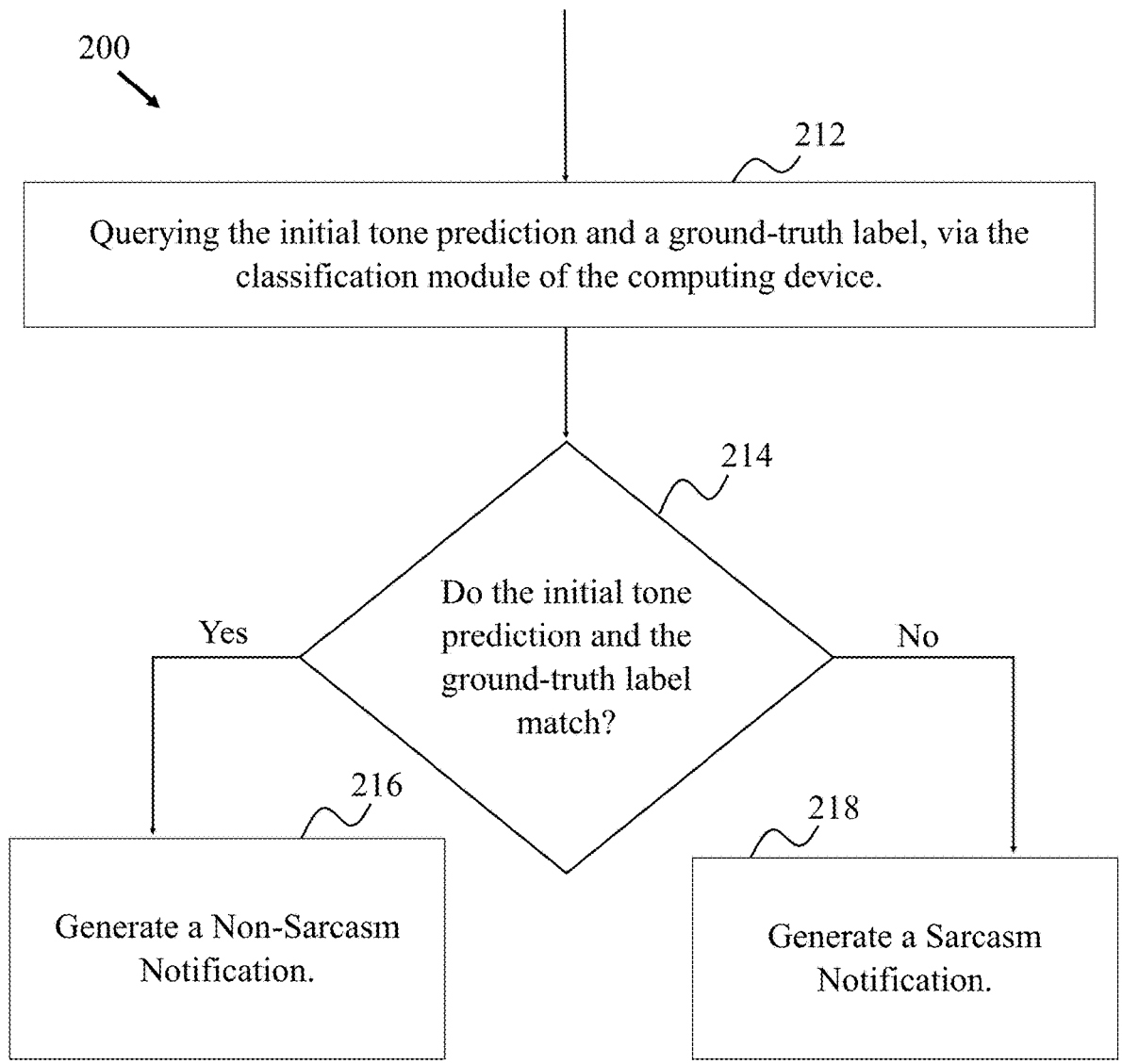

Referring to FIG. 2, an exemplary process-flow diagram is provided, depicting a method of detecting a presence of sarcasm within a batch of text of an application, according to an embodiment of the present disclosure. The steps delineated in the exemplary process-flow diagram of FIG. 2 are merely exemplary of an order of adjusting a color scheme on a computing device. The steps may be carried out in another order, with or without additional steps included therein.

As shown in FIG. 2, the method 200 includes a step 202 of converting the batch of text, via a processor of a computing device, into at least one aspect embedding. In an embodiment, during data pre-processing, at least one aspect embedding may be used to process the batch of text. Accordingly, at least one aspect embedding may include a clustering of text based on the local context of particular text within the batch of text. Additionally, in some embodiments, the at least one aspect embedding may include a clustering of text based on a global context, such that the aspect embedding may consider an association between a particular word and every other word in a sentence. For example, aspect embeddings that rely on local context may include but are not limited to Continuous Bag of Words (hereinafter "CBOW"), Skip Grams, Word2Vec, and/or any local context that is known in the art. In addition, aspect embeddings that capture global context include but are not limited to global vectors for word representation (hereinafter "GloVe"), FastText, Embeddings from Language Models (hereinafter "ELMO") Bidirectional Encoder Representations from Transformers (hereinafter "BERT"), and/or any global context known in the art. In some embodiments, the at least one aspect embedding may be used to capture an overall context of the batch of text, such that the context is indicative of sarcasm within the batch of text.

Next, during step 204 of method 200, after pre-processing and conversion into at least one aspect embedding, in an embodiment, the at least one aspect embedding may be transmitted to a multi-head self-attention module, via a processor of a computing device. In this manner, given at least one aspect embedding, a tokenizer may be applied to obtain dimensional embeddings D for at least one aspect embedding within a given batch of text. In some embodiments, the tokenizer may be applied in addition to pre-trained models to obtain at least one dimensional embedding D for at least one aspect embedding within the given batch of text. In an embodiment, the at least one dimensional embedding ($S=\{e_1, e_2, \ldots, e_N\}, S \in \mathbb{R}^{N \times D}$) may conform the at least one aspect embedding to the model. Accordingly, in order to detect sarcasm in sentence S, in some embodiments, specific aspect embeddings may be identified, such that essential cues to tone may be provided, for example as sarcastic connotations and negative emotions. In some embodiments, the cues may be dependent on the local context and/or global context of the at least one aspect embedding. In this manner, the importance of these cue-words depends on multiple factors that are based on different contexts. In this embodiment, the multi-head self-attention may be leveraged to identify these cue-words from the at least one aspect embedding.

Furthermore, during step 204 and step 206 of method 200, as shown in FIG. 2, in an embodiment, an attention module may be a mechanism configured to discover patterns in the input that are crucial for solving the given task. In deep learning models, self-attention may be an attention mechanism for sequences which helps learn the task-specific relationship between different elements of a given sequence to produce a better sequence representation. In this embodiment, in the self-attention module, there may be three linear projections: Key (K), Value (V), and Query (Q) of the given at least one dimensional embedding, may be generated, such that K, Q, V $\in \mathbb{R}^{N \times D}$. Accordingly, in this embodiment, an attention map may be computed based on the similarity between K, Q, and the output of the self-attention module. As such, in this embodiment, A $\in \mathbb{R}^{N \times D}$ may also be the self-attention value between V and the learned softmax attention ($QK^T$), as provided in the equation below:

$$A = \mathrm{softmax}(QK^T/\sqrt{D})$$

In some embodiments, the multi-head self-attention module may provide multiple copies of the self-attention module, such that the multiple copies are used in parallel. Furthermore, in these other embodiments, each head may capture different relationships between the at least one aspect embedding in the batch of text and may identify a keyword, such that the keyword aids in classification. In this embodiment, the self-attention module may use a series of multi-head self-attention layers (hereinafter "#L") with multiple heads ("#H") in each layer. In some embodiments, the self-attention module may use at least 1 #L, 2 #L, 3 #L, 4 #L, 5 #L, 6 #L, 7#L, and/or 8 #L with at least 1 #H, 2 #H, 3 #H, 4 #H, and/or 5 #H.

In an embodiment, as multi-head self-attention module finds the aspect embedding within the batch of text that may be important in detecting sarcasm, some aspect embeddings may be proximate to each other or may be spaced apart within the input batch of text. Referring again to FIG. 2, during step 208 of method 200, a GRU may be used to learn a long-distance relationships between at least one aspect embedding within a batch of text. In some embodiments, the GRUs may be designed to dynamically remember and forget the information flow using Reset gates ($r_t$) and Update gates ($z_t$) to solve the vanishing gradient problem, that is normally found within standard recurrent neural networks. Additionally, in this embodiment, a single layer of bi-direction a GRU may be used to process the self-attention value A of the batch of text in order to make use of the contextual information from local and global contexts. In addition, during step 208, using the self-attention value, A $\in \mathbb{R}^{N \times D}$ (e.g., the output of the self-attention module), the GRU may compute hidden states H={$h_1, h_2, \ldots, h_N$}, H $\in \mathbb{R}^{N \times D}$ for at least one aspect embedding of the batch of text found within the input, A $\in \mathbb{R}^{N \times D}$, as provided in the equation below:

$$r_t = \sigma(W_r A_t + U_r h_{t-1} + b_r)$$

$$z_t = \sigma(W_z A_t + U_z h_{t-1} + b_z)$$

$$\tilde{h}_t = \tan h(W_h A_t + U_h(r_t \odot h_{t-1}) + b_r)$$

$$h_t = z_t \odot h_t + (1-z_t) \odot h_{t-1}$$

In an embodiment, the GRU module may encompass a sigmoid function. Accordingly, in this embodiment, $\odot$ may represent a $\sigma$, such that it may be the element-wise sigmoid function, and W, U, and b are the trainable weights and biases $r_t$, $z_t$, $h_t$, $\tilde{h}_t \in \mathbb{R}^d$, where d is the size of the hidden dimension. Accordingly, in this embodiment, the GRU module may create a sarcasm output. In some embodiments, the sarcasm output of the GRU module may comprise a vector. Additionally, in some embodiments, the final hidden state, $h_N$, may be the sarcasm output from the GRU module.

Next, as shown in FIG. 2, at step 210, in an embodiment the sarcasm output of the GRU may be transmitted to a classification module, via the processor of the computing device. In some embodiments, during this step of the model, a single fully-connected feed-forward layer may be used with sigmoid activation. In this manner, at step 212, the classification module may compute the initial tone prediction from the sarcasm output of the GRU, $h_N$. In this manner, the initial tone prediction of the fully connected layer is a probability score y $\in[0,1]$ computed as shown in equation provided below:

$$y = \sigma(W h_N + b)$$

Where W $\in \mathbb{R}^{d \times 1}$ are the weights of this layer, b is the bias term, and y is the initial tone prediction.

The method then proceeds to step 214, and results in either step 216 or step 218, depending on whether sarcasm may be detected within the at least one aspect embedding of the batch of text. Accordingly, at step 214, in an embodiment, the classification module may query the initial ton prediction, such that a binary cross entropy (BCE) loss between the initial tone prediction y (also referred to as the "sarcasm prediction output") and a ground-truth label $\hat{y}$ may be calculated as shown in the equation provided below:

$$\mathrm{loss}(y, \hat{y}) = \hat{y}\log(y) + (1-\hat{y})\log(1-y)$$

Where $\hat{y} \in \{0,1\}$ is the binary label (for example, 1:Sarcasm and 0:No-Sarcasm) and y is the initial tone prediction. Accordingly, in some embodiments, the equation provided above may be used to train modules.

During step 216, in an embodiment, the classification module of the computing device may determine that a substantial match does exist between the initial tone prediction and the ground-truth label. As such, during step 216, the processor may execute instructions to generate a notification comprising a non-sarcasm score for the at least one aspect embedding of the batch of text of the application when the application is displayed. Accordingly, the display associated with the computing device includes the non-sarcasm score. In some embodiments, the non-sarcasm score may be zero (0) based on the binary label provided by the comparison between the initial tone prediction and ground-truth label of the classification module.

During step 218, in an embodiment, the processor of the computing device determines that a substantial match does not exist between the initial tone prediction and the ground-truth label. As such, during step 218, the processor executes instructions to generate a notification comprising a sarcasm score for at least one aspect embedding of the batch of text of the application when the application is displayed. Accordingly, the display associated with the computing device includes the sarcasm score. In some embodiments, the sarcasm score, may be one (1), based on the binary label provided by the comparison between the initial tone prediction and the ground-truth label of the classification module.

Figure 3:
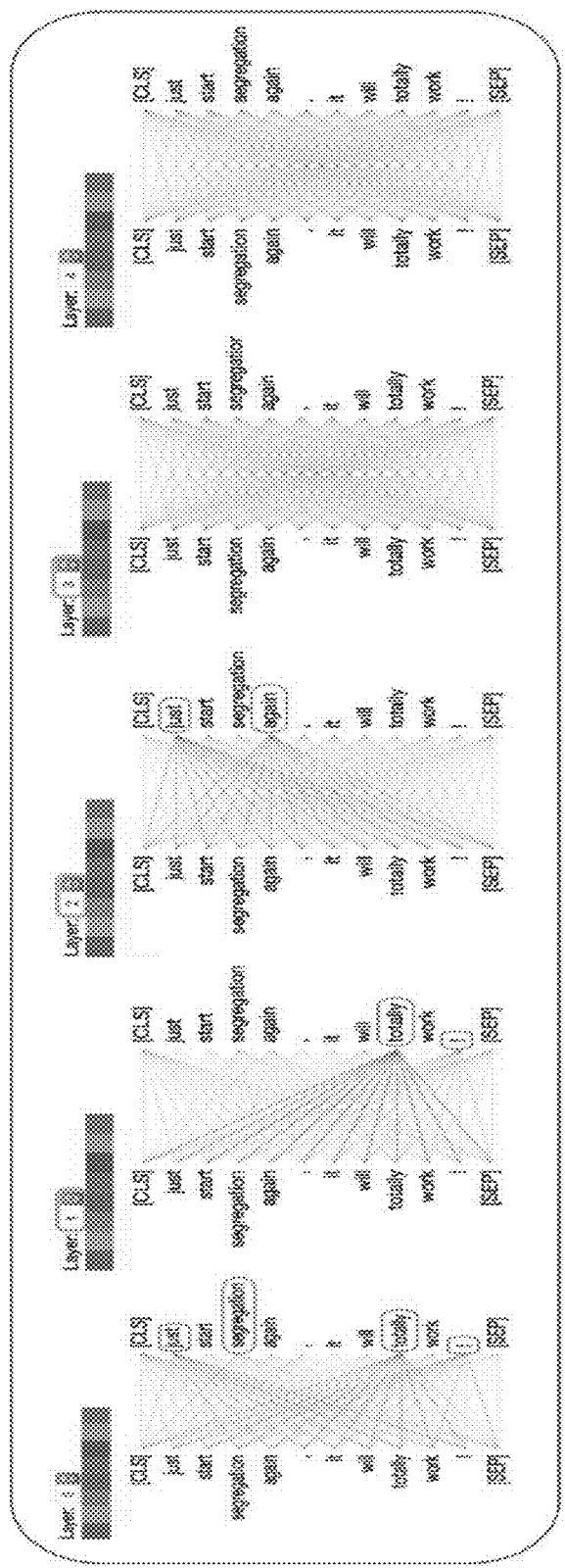
FIG. 3 depicts an exemplary embodiment of an attention analysis map using a sample batch of text to detect sarcasm, according to an embodiment of the present disclosure.
Figure 4:
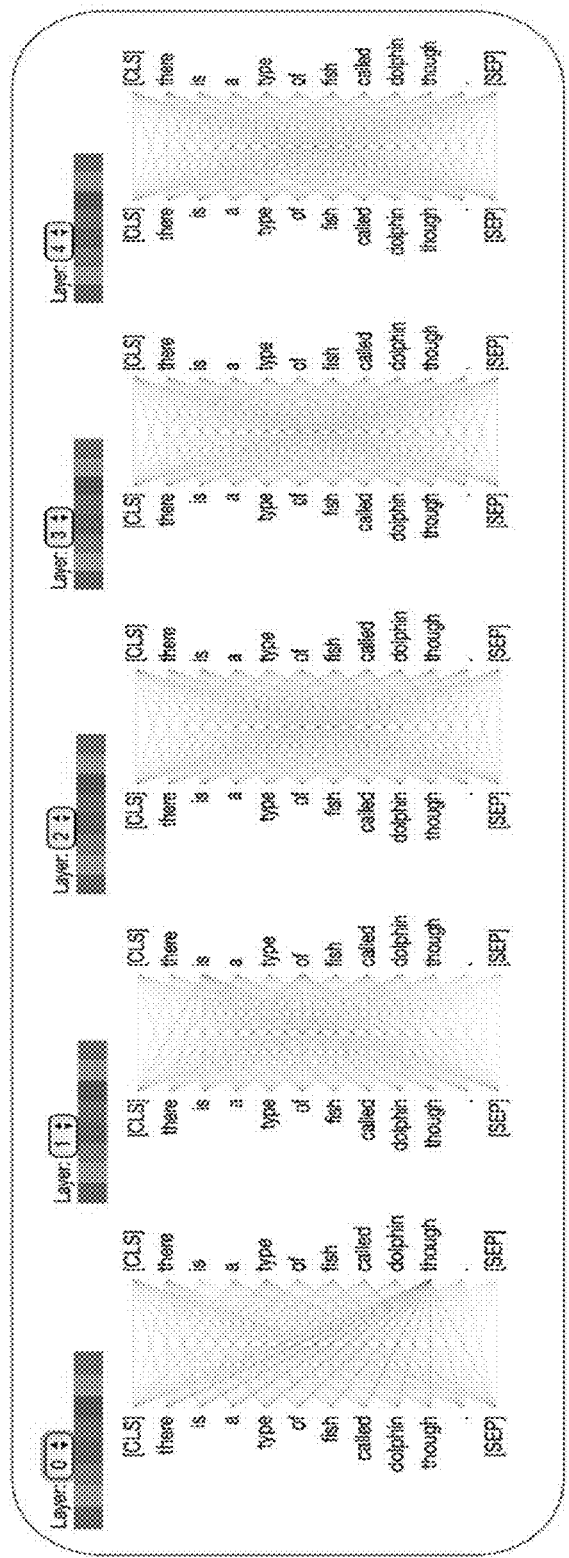
FIG. 4 depicts an alternative exemplary embodiment of an attention analysis map using a sample batch of text to detect sarcasm, according to an embodiment of the present disclosure.
Figure 5:
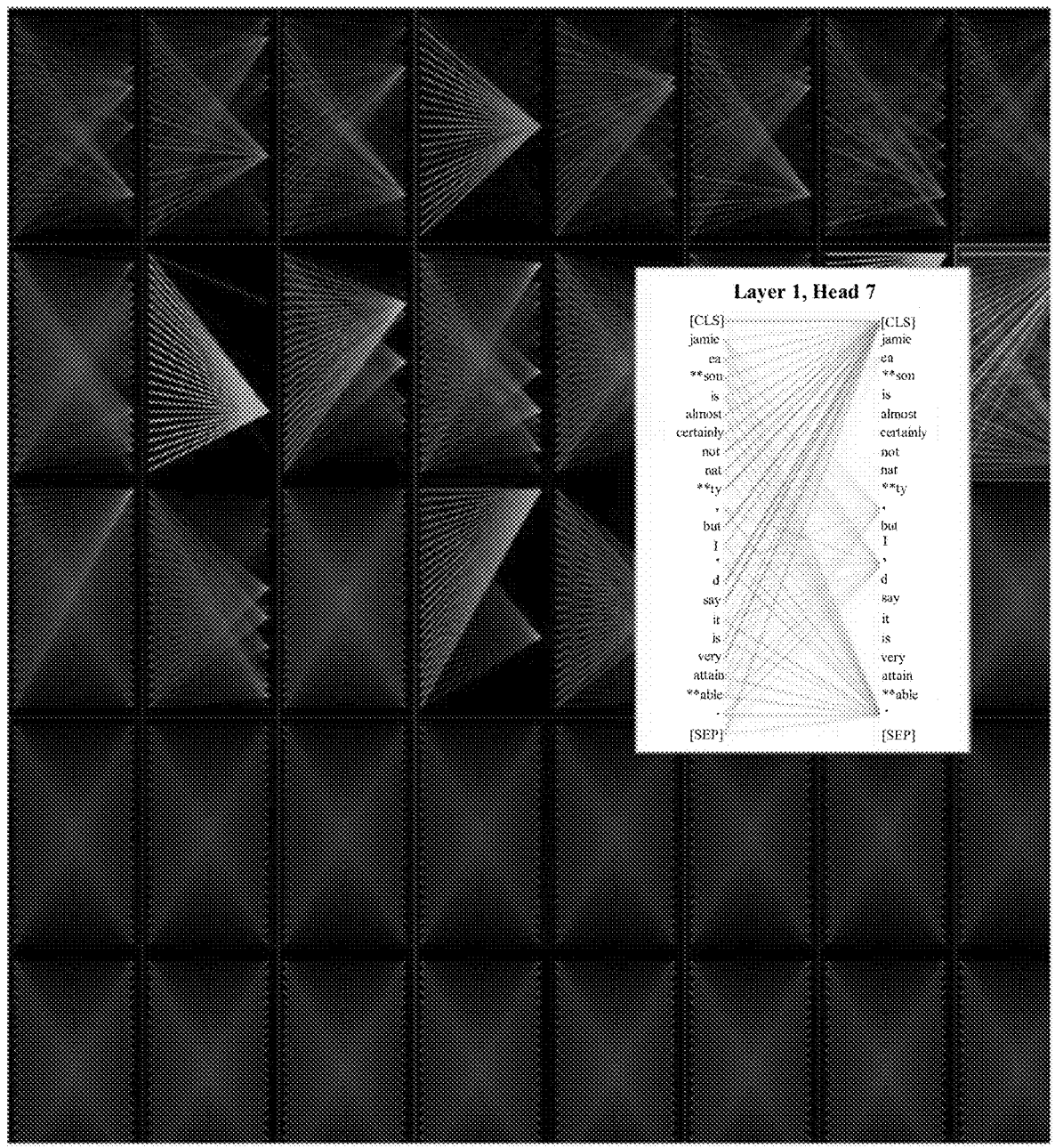
FIG. 5 depicts an alternative exemplary embodiment of an attention analysis map using a sample batch of text to detect sarcasm, according to an embodiment of the present disclosure.
Figure 6:
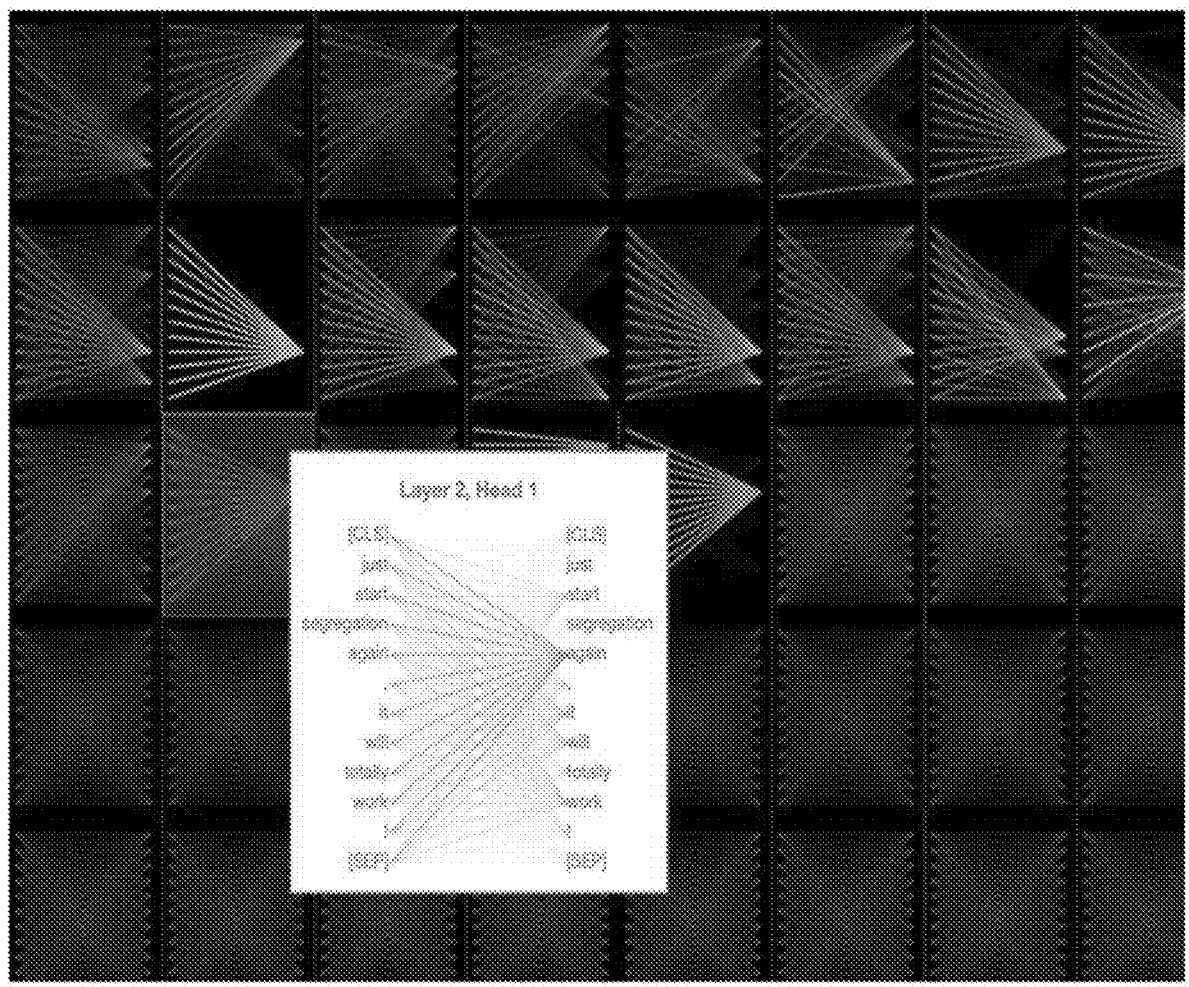
FIG. 6 depicts an alternative exemplary embodiment of an attention analysis map using a sample batch of text to detect sarcasm, according to an embodiment of the present disclosure.

Sarcasm Architecture Interpretation:

The present disclosure may further include attention maps. In an embodiment, an attention map may be created for, such that the individual heads of the self-attention layers may be used to provide the learned attention weights for each time-step in the input. Accordingly, each time-step may be at least on aspect embedding and a per-aspect attention weight may be visualized for sample batches of text with and without sarcasm from the application. In this embodiment, the multi-head self-attention module may comprise the #L preset to 5 and the #H preset to 8 per attention. As shown in FIGS. 3-4, in some embodiments, the attention analysis for at least two batches of text with sarcasm, as shown in FIG. 3, and without sarcasm, as shown in FIG. 4 may be analyzed. Additionally, each column, as shown in FIGS. 3-4 may correspond to a single attention layer, such that the attention weights between the at least one aspect embedding in each head are represented using colored edges. In some embodiments, the darkness of an edge may indicate the strength of the attention weight. For example, CLS represents a classification token, and SEP represents a separator token. In addition, FIGS. 5-6 depicts alternative exemplary embodiments of an attention analysis map using a sample batch of text to detect sarcasm, according to an embodiment of the present disclosure. In some embodiments, the rows may correspond at least five attention layers, and the columns may correspond to at least eight heads in each layer. As shown in FIGS. 5-6, in some embodiments, the at least one aspect embedding receiving the most attention may vary between different heads in each layer and also across layers.

Referring again to FIG. 3, in an embodiment, when a batch of text includes sarcasm, at least one aspect embedding ("sarcasm aspect") within the batch of text may receive more attention than another aspect embedding within the batch of text. For example, the at least one aspects embedding may include words such as "just," "again," "totally," along with exclamation points, may have darker edges connecting them with at least one other aspect embedding in the batch of text. Accordingly, the at least one aspect embeddings within the batch of text which may be targeted due to having a hint at sarcasm may receive higher attention than another aspect embedding within the batch of text. In addition, in some embodiments, each aspect embedding may be attended by a different head in at least the first three (3) layers of self-attention. In these other embodiments, in the final two (2) layers, the attention may be spread out to at least one other aspect embedding within the batch of text, such that the redundancy of these layers in the model may be indicated. Contrarily, in an embodiment, as shown in FIG. 4, when a batch of text contains no sarcasm, at least one aspect embedding may not be highlighted by any head in any layer. In some embodiments, each aspect embedding may be attended by a different head in at least the first two (2), four (4), and/or five (5) layers of self-attention. Additionally, in some embodiments, the at least one aspect embedding within the batch of text which are targeted due to having a hint at sarcasm may receive a lower attention than aspect embeddings within the batch of text. Moreover, in these other embodiments, the specific aspects may have lighted edges connecting them with every other aspect in the batch of text.

FIG. 7 depicts a sarcastic and non-sarcastic attention analyses including predictive results for sample batch of text, according to an embodiment of the present disclosure. In an embodiment, the attention weight for at least one aspect embedding may be computed by first considering the maximum attention the at least one aspect embedding receives across at least one layer of the multi-layer self-attention module. Next, the multi-head self-attention module may average the aspect weights across at least one head in the at least one layer. Finally, in this embodiment, the aspect weight for the aspect may be averaged over all the aspect embeddings in the batch of text. Accordingly, in this embodiment, the stronger the highlight for the at least one aspect embedding, the higher the attention weight may be placed on the at least one aspect embedding by the multi-head self-attention module, while the multi-head self-attention module is classifying the sentence. In some embodiments, at least one aspect embedding in the batch of text with higher weights show that the model can detect sarcastic characteristics of the aspect in the batch of text. For example, as shown in FIG. 7, in some embodiments, the at least one aspect embedding, which may include words such as "totally," "first," and "ever" from the batch of text, as well as the aspect embeddings, such as "even," "until," and "already" from the batch of text, may receive a higher weight as the words that exhibit sarcasm in the batch of text, as identified by the at least one multi-head self-attention module. Furthermore, in some embodiments, in the batch of text, which is classified as non-sarcastic, the weights for the at least one aspect embedding may be low in comparison to at least one aspect embedding which may comprise sarcastic characteristics from the batch of text. In this manner in some embodiments, the weaker the highlight for the at least one aspect embedding, the higher the attention may be placed on the aspect embedding by the multi-head self-attention module, while the multi-head self-attention module is classifying the sentence.

In an embodiment multi-head self-attention-based neural network architecture may be used to detect tone in a batch of text. Accordingly, the multi-head self-attention may be additionally used to highlight at least one aspect embedding in the batch of text which provide crucial cues for tone detection. In addition, in some embodiments, GRUs may aid in learning the long-distance relationships among the at least one highlighted aspect embeddings in the batch of text. As such, the sarcasm prediction output from the GRU may be passed through a fully-connected classification layer of a classification module to obtain the final non-sarcasm notification and/or the final sarcasm notification. As shown below, several experiments were conducted on multiple datasets from varied data sources and show significant improvement over the state-of-the-art models by all evaluation metrics. The results from ablation studies and analysis of the trained model, including analyses of the learned attention weights used to interpret the trained model, show that the model may automatically identify at least one aspect embedding in the batch of text which may provide cues for tone, optimizing tone detection of the batch of text.

The following examples are provided for the purpose of exemplification and are not intended to be limiting.

EXAMPLES

Various existing datasets, as shown in Table 1, provided below, were used to test the system and method described in detail above. Each dataset includes a data source and the sample counts in train and test values, and each set is sourced from varied online platforms, including but not limited to social networking platforms and discussion forums.

TABLE 1

| Dataset Source | Train | Test | Total | Sarcastic | Non-Sarcastic |
|---|---|---|---|---|---|
| TWITTER ™, 2013* | 1.368 | 588 | 1.956 | 308 | 1.648 |
| Online Dialogues, 2016** | 3.754 | 938 | 4.692 | 2.346 | 2.346 |
| TWITTER ™, 2017*** | 51.189 | 3.742 | 54.931 | 25.872 | 29.059 |
| REDDIT ™, 2018**** | 154.702 | 64.666 | 219.368 | 109.684 | 109.684 |
| News Headlines, 2019***** | 22.895 | 5.724 | 28.619 | 13.634 | 14.985 |

*In the TWITTER ™, 2013 dataset, the batches of text (referred to as "tweets") that contain sarcasm are identified and labeled by a human annotator solely based on the contents of the text. These batches of text do not depend on prior conversational context and are limited to each single batch of text. Aspect embeddings that does not include sarcasm or those which required prior conversational context are labeled as non-sarcastic. As a pre-processing step, URLs (uniform resource locators) and usenames are removed from the batches of text.
**In the Online Dialogues, 2016 dataset, which is a part of the Internet Argument Corpus, includes annotated quote-response pairs for sarcasm detection. Batches of text are assigned classifiers including general sarcasm, hyperbole, and rhetorical. In these quote-response pairs, a quote is a dialogic parent to the response. Therefore, a response post can be mapped to the same quote post or the post earlier in the thread. In the experiments described herein, the quoted text is used as a context for sarcasm detection.
***In the TWITTER ™, 2017 dataset, batches of text (referred to as "tweets") are collected by a specific account. The dataset not only contains the tweets and the replies thereto, but also the mood of the posting party at the time of tweeting. The tweets/re-tweets of the posting parties are used as the content, and the replies to the tweets are used as the context. Similar to the TWITTER ™, 2013 dataset, batches of text in this dataset are pre-processed by removing URLs and replacing usernames.
****In the REDDIT ™, 2018 dataset, a self-annotated corpus for sarcasm, SARC 2.0, contains comments from a particular online discussion forum. Often during online communication, such as those communications that occur on discussion forums, users will self-annotate a publication with "\s" to denote a sarcastic intent. These self-annotated publications are altered to remove the "\s" denotation, and only the original comment is used without using any parent or child comments. Two variants of the dataset, "Main Balanced" and "Political," are used in the experiments, with the "Political" dataset being linked to a particular subforum dedicated to political discussions.
*****In News Headlines, 2019 dataset, headlines of news stories are collected from two sources: a sarcastic publication under the trade name THE ONION ™, and a news Organization published under the trade name HUFFPOST ™. In this dataset, the headlines of stories are used as the content, and the text within the articles is used as the context.

To tokenize and extract at least one aspect embedding for the input batch of text, publicly available resources are used. Specifically, tokenizer and pre-trained weights from the "BERT-base-uncased" model are used to convert a portion of the batch text to tokens, and to subsequently convert tokens to at least one aspect embeddings. The pre-trained BERT model is trained with inputs of maximum length N=512 by truncating longer inputs and padding shorter inputs with a special token <pad>. To extract the at least one aspect embedding, the weights of the pre-trained BERT model are frozen and inputs are truncated or padded (with token <pad>) based on the input length.

The 768-dimensional output for each word in the input from the final hidden layer of the BERT model is considered as the aspect embeddings. The at least one aspect embedding for the portion of the batch of text are passed through a series of multi-head self-attention layers #L, with multiple heads #H in each of the layers. The output from the self-attention layer is passed through a single bi-directional GRU layer with its hidden dimension d=512. The 512-dimensional output feature vector from the GRU layer is passed through the fully connected layer to yield a 1-dimensional output ("sarcasm output"). A sigmoid activation is applied to the sarcasm output and BCE loss is used to compute the loss between the ground truth and the predicted probability score.

The parameters in the model include weights from the Multi-Head Attention, GRU, and Fully Connected layers, as described above. When using the BERT model for extracting the at least one aspect embedding, the model is initialized with pre-trained weights and frozen while training. An Adam optimizer is used to train the model with approximately 13 million parameters, using a learning rate of $1e^{-4}$, a batch size of 64, and a dropout set of 0.2. For reach experiment, #H=8 and #L=3 were preset.

Sarcasm Detection was posed as a classification problem using Precision (ratio of the number of correctly predicted sarcastic sentences to the total number of predicted sarcastic sentences), Recall (ratio of correctly predicted sarcastic sentences to the actual number of sarcastic sentences in the ground-truth), F1-Score (harmonic mean of precision and recall), and Accuracy as evaluation metrics to test the performance of the trained models. A threshold of 0.5 was used on the predictions from the model to compute these scores. Apart from these standard metrics, the Area Under the ROC Curve (AUC score) was also calculated, which is threshold independent.

Example 1

Sarcasm Multi-Head Self-Attention Architecture Compared to Closest Art

As shown in Tables 2-6, provided below, the results of the system and method based on publicly available datasets are presented and compared to existing methods. In each experiment, the system and method described herein outperformed the prior art, indicating the enhancement in accuracy associated with the model and optimization of sarcasm detection, as described above.

Referring again to Tables 2-6, attention maps were created for each experiment, using the individual heads of the self-attention layers to provide the learned attention weights for each time-step in the input. In the model, each time-step is an aspect and the per-aspect attention weights are visualized for sample batches of text with and without sarcasm from the REDDIT™, 2018 dataset. In the model, #L was preset to 5 and #H was preset to 8 per attention. As shown in FIGS. 3-4, the attention analysis for two sample sentences with sarcasm and without sarcasm (FIG. 4) are analyzed. Each column in FIGS. 3-4 corresponds to a single attention layer, and attention weights between words in each head are represented using colored edges. The darkness of an edge indicates the strength of the attention weight. CLS represents a classification token, and SEP represents a separator token. In addition, FIGS. 5-6 represent another visualization that provides an overview of attention across all the heads and layers in the model. The rows correspond to five attention layers, and the columns correspond to eight heads in each layer. As shown in FIGS. 5-6, the words receiving the most attention vary between different heads in each layer and also across layers.

Referring specifically to FIG. 3, for a batch of text that includes sarcasm, certain aspects receive more attention than others. For instance, aspect embeddings such as "just," "again," "totally," and exclamation points have darker edges connecting them with every other word in a sentence. These are the aspects in the batch of text that hint at sarcasm and, as expected, these receive higher attention than others. In addition, each cue aspect is attended by a different head in the first three layers of self-attention. In the final two layers, the attention is spread out to every word in the sentence, indicating the redundancy of these layers in the model. Contrarily, a sample batch of text having no sarcasm is shown in FIG. 4; no aspect embedding is highlighted by any head in any layer.

Turning to FIG. 7, the distribution of attention over the words in a sentence for six sample sentences is visualized. An attention weight for an aspect is computed by first considering the maximum attention it receives across layers, and then averaging the weights across multiple heads in the layer. Finally, the weights for an aspect are averaged over all the words in the sentence. The stronger the highlight for a word, the higher the attention weight placed on it by the model while classifying the sentence. Aspects from the sarcastic batches of text with higher weights show that the model can detect sarcastic cues from the batch of text. For example, the words "totally," "first," and "ever" from the first sentence, as well as the aspects "even," "until," and "already" from the third sentence, receive a higher weight as the words that exhibit sarcasm in the sentences, as identified by the model. In all the samples that are classified as non-sarcastic, the weights for the individual words are very low in comparison to cue-words from the sarcastic sentences.

TABLE 2

| Model | Precision | Recall | F1 | AUC |
|---|---|---|---|---|
| NBOW | 71.2 | 62.3 | 64.1 | — |
| Vanilla CNN | 71.0 | 67.1 | 68.5 | — |
| Vanilla LSTM | 67.3 | 67.2 | 67.2 | — |
| Attention LSTM | 68.7 | 68.6 | 68.7 | — |
| Bootstrapping | 62.0 | 44.0 | 51.0 | — |
| EmotIDM | — | — | 75.0 | — |
| Fracking Sarcasm | 88.3 | 87.9 | 88.1 | — |
| GRNN | 66.3 | 64.7 | 65.4 | — |
| ELMo-BiLSTM | 75.9 | 75.0 | 75.9 | — |
| ELMo-BiLSTM FULL | 77.8 | 73.5 | 75.3 | — |
| ELMo-BiLSTM AUG | 68.4 | 70.8 | 69.4 | — |
| A2Text-Net | 91.7 | 91.0 | 90.0 | 97.0 |
| This Work | 97.9 | 99.6 | 98.7 | 99.6 |
| Improvement over Closest Art | +6.2 | +8.6 | +8.7 | +2.6 |

TABLE 3

| Model | Precision | Recall | F1 | AUC |
|---|---|---|---|---|
| Sarcasm Magnet | 73.3 | 71.7 | 72.5 | — |
| Sentence-level Attention | 74.9 | 75.0 | 74.9 | — |
| Self Matching Networks | 76.3 | 72.5 | 74.4 | — |
| A2Text-Net | 80.3 | 80.2 | 80.1 | 88.4 |
| This Work | 80.9 | 81.8 | 81.2 | 88.6 |
| Improvement over Closest Art | +0.6 | +1.6 | +1.1 | +0.2 |

TABLE 4

| | Main-Balanced | | Political | |
|---|---|---|---|---|
| Model | Accuracy | F1 | Accuracy | F1 |
| Bag-of-Words | 63.0 | 64.0 | 59.0 | 60.0 |
| CNN | 65.0 | 66.0 | 62.0 | 63.0 |
| CNN-SVM | 68.0 | 68.0 | 70.65 | 67.0 |
| CUE-CNN | 70.0 | 69.0 | 69.0 | 70.0 |
| CASCADE | 77.0 | 77.0 | 74.0 | 75.0 |
| SARC 2.0 | 75.0 | — | 76.0 | — |
| ELMo-BiLSTM | 72.0 | — | 78.0 | — |
| ELMo-BiLSTM FULL | 76.0 | 76.0 | 72.0 | 72.0 |
| This Work | 81.0 | 81.0 | 80.0 | 80.0 |
| Improvement over Closest Art | +4.0 | +4.0 | +2.0 | +5.0 |

TABLE 5

| Model | Precision | Recall | F1 | AUC |
|---|---|---|---|---|
| NBOW | 66.0 | 66.0 | 66.0 | — |
| Vanilla CNN | 68.4 | 68.1 | 68.2 | — |
| Vanilla LSTM | 68.3 | 63.9 | 60.7 | — |
| Attention LSTM | 70.0 | 69.6 | 69.6 | — |
| GRNN | 62.2 | 61.8 | 61.2 | — |

TABLE 5-continued

| Model | Precision | Recall | F1 | AUC |
|---|---|---|---|---|
| CNN-LSTM-DNN | 66.1 | 66.7 | 65.7 | — |
| SIARN | 72.1 | 71.8 | 71.8 | — |
| MIARN | 72.9 | 72.9 | 72.7 | — |
| ELMo-BiLSTM | 74.8 | 74.7 | 74.7 | — |
| ELMo-BiLSTM FULL | 76.0 | 76.0 | 76.0 | — |
| This Work | 77.4 | 77.2 | 77.2 | 83.4 |
| Improvement over Closest Art | +1.2 | +1.4 | +1.2 | |

TABLE 6

| Model | Precision | Recall | F1 | Accuracy | AUC |
|---|---|---|---|---|---|
| Hybrid | — | — | — | 89.7 | — |
| A2Text-Net | 86.3 | 86.2 | 86.2 | — | 93.7 |
| This Work | 91.9 | 91.8 | 91.8 | 91.6 | 97.4 |
| Improvement over Closest Art | +5.6 | +5.6 | +5.6 | +1.9 | +3.7 |

Example 2

Multi-Head Self-Attention Architecture with Fixed Heads and Variable Layers

In addition, as shown in Table 7, provided below, the Sarcasm Corpus v2 Dialogues dataset was used in an ablation study ("Ablation 1"), in which the number of self-attention layers (#L) are varied, and the number of heads per layer are fixed (#H=8). From the results presented in Table 7, as the number of self-attention layers increases (#L=0, 1, 3, 5), the improvement in the performance of the model due to the additional layers becomes saturated. Due to current memory constraints, it was not feasible to have more than five self-attention layers in the model; however, it should be appreciated that with greater computing power, more self-attention layers can be used. These results show that the multi-head self-attention model achieves a 2% improvement over the baseline model where only a single GRU layer is used without any self-attention layers.

TABLE 7

| #L-Layers | Precision | Recall | F1 |
|---|---|---|---|
| 0 (GRU only) | 75.6 | 75.6 | 75.6 |
| 1 Layer | 76.2 | 76.1 | 76.1 |
| 3 Layers | 77.4 | 77.2 | 77.2 |
| 5 Layers | 77.6 | 77.6 | 77.6 |

Example 3

Multi-Head Self-Attention Architecture with Fixed Layers and Variable Heads

Additionally, as shown in Table 8, provided below, the Sarcasm Corpus v2 Dialogues dataset was used in an ablation study ("Ablation 2"), in which the number of heads per layer (#H) are varied, and the number of self-attention layers are fixed (#L=3). From the results presented in Table 8, the performance of the model increases with the increase in the number of heads per self-attention layer.

TABLE 8

| #H-Heads | Precision | Recall | F1 |
|---|---|---|---|
| 1 Head | 74.9 | 74.5 | 74.4 |
| 4 Heads | 76.9 | 76.8 | 76.8 |
| 8 Heads | 77.4 | 77.2 | 77.2 |

Example 4

Multi-Head Self-Attention Architecture with Multiple Aspect Embeddings

A further ablation study ("Ablation 3"), as shown in Table 9, provided below, was performed in which the system and method described herein was trained with different aspect embeddings, including Glove-6B, Glove-840B, ELMO, and FastText, and compared to existing models. In these experiments, #H was set to 8 and #L was set to 3, using each dataset described above. The results showed improvements over the prior art, indicating that the model can achieve improved results regardless of the at least one aspect embedding selected during pre-processing.

TABLE 9

| Model | Embeddings | Precision | Recall | F1 | AUC |
|---|---|---|---|---|---|
| MIARN | — | 72.9 | 72.9 | 72.7 | — |
| ELMo-BiLSTM FULL | ELMO | 76.0 | 76.0 | 76.0 | — |
| This Work | BERT | 77.4 | 77.2 | 77.2 | 83.4 |
|  | ELMO | 76.7 | 76.7 | 76.7 | 80.8 |
|  | FastText | 75.7 | 75.7 | 75.7 | 81.6 |
|  | Glove 6B | 76.0 | 76.0 | 76.0 | 82.3 |
|  | Glove 840B | 77.0 | 77.0 | 77.0 | 82.9 |

REFERENCES

Shamay-Tsoory, S. G.; Tomer, R.; Aharon-Peretz, J. The neuroanatomical basis of understanding sarcasm and its relationship to social cognition. Neuropsychology 2005, 19,288.

Skalicky, S.; Crossley, S. Linguistic Features of Sarcasm and Metaphor Production Quality. In Proceedings of the Workshop on Figurative Language Processing, New Orleans, LA, USA, 6 Jun. 2018; pp. 7-16.

Kreuz, R. J.; Caucci, G. M. Lexical influences on the perception of sarcasm. In Proceedings of the Workshop on Computational Approaches to Figurative Language, Association for Computational Linguistics, Rochester, NY, USA, 26 Apr. 2007; pp. 1-4.

Joshi, A.; Sharma, V.; Bhattacharyya, P. Harnessing context incongruity for sarcasm detection. In Proceedings of the 53rd Annual Meeting of the ACL and the 7th IJCNLP, Beijing, China, 26-31 Jul. 2015; pp. 757-762.

Ghosh, A.; Veale, T. Magnets for sarcasm: Making sarcasm detection timely, contextual and very personal. In Proceedings of the 2017 Conference on EMNLP, Copenhagen, Denmark, 7-11 Sep. 2017; pp. 482-491.

Ilic, S.; Marrese-Taylor, E.; Balazs, J.; Matsuo, Y. Deep contextualized word representations for detecting sarcasm and irony. In Proceedings of the 9th Workshop on Computational Approaches to Subjectivity, Sentiment and Social Media Analysis, Brussels, Belgium, 31 Oct. 2018; pp. 2-7.

Ghosh, D.; Fabbri, A. R.; Muresan, S. Sarcasm analysis using conversation context. Comput. Linguist. 2018, 44, 755-792.

Xiong, T.; Zhang, P.; Zhu, H.; Yang, Y. Sarcasm Detection with Self-matching Networks and Low-rank Bilinear Pooling. In Proceedings of the World Wide Web Conference, San Francisco, CA, USA, 13-17 May 2019; pp. 2115-2124.

Liu, L.; Priestley, J. L.; Zhou, Y.; Ray, H. E.; Han, M. A2text-net: A novel deep neural network for sarcasm detection. In Proceedings of the 2019 IEEE First International Conference on Cognitive Machine Intelligence (CogMI); IEEE: New York, NY, USA, 2019; pp. 118-126.

Carvalho, P.; Sarmento, L.; Silva, M. J.; De Oliveira, E. Clues for detecting irony in user-generated contents: Oh . . . !! it's so easy. In Proceedings of the 1st International CIKM Workshop on Topic-Sentiment Analysis for Mass Opinion; Association for Computing Machinery: New York, NY, USA, 2009; pp. 53-56.

González-Ibánez, R.; Muresan, S.; Wacholder, N. Identifying sarcasm in Twitter: A closer look. In Proceedings of the 49th Annual Meeting of the ACL: Human Language Technologies: Short Papers, Portland, OR, USA, 19-24 Jun. 2011; Volume 2, pp. 581-586.

Tsur, O.; Davidov, D.; Rappoport, A. ICWSM—A great catchy name: Semi-supervised recognition of sarcastic sentences in online product reviews. In Proceedings of the Fourth International AAAI Conference on Weblogs and Social Media, Washington, DC, USA, 23-26 May 2010.

Davidov, D.; Tsur, O.; Rappoport, A. Semi-supervised recognition of sarcastic sentences in twitter and amazon. In Proceedings of the Fourteenth Conference on Computational Natural Language Learning; Association for Computational Linguistics: Stroudsburg, PA, USA, 2010; pp. 107-116.

Riloff, E.; Qadir, A.; Surve, P.; De Silva, L.; Gilbert, N.; Huang, R. Sarcasm as contrast between a positive sentiment and negative situation. In Proceedings of the 2013 Conference on EMNLP, Seattle, WA, USA, 18-21 Oct. 2013; pp. 704-714.

Wallace, B. C.; Charniak, E. Sparse, contextually informed models for irony detection: Exploiting user communities, entities and sentiment. In Proceedings of the 53rd Annual Meeting of the ACL and the 7th IJCNLP, Beijing, China, 26-31 Jul. 2015; pp. 1035-1044.

Poria, S.; Cambria, E.; Hazarika, D.; Vij, P. A Deeper Look into Sarcastic Tweets Using Deep Convolutional Neural Networks. In Proceedings of the COLING 2016, the 26th International Conference on Computational Linguistics: Technical Papers, Osaka, Japan, 11-16 December 2016; pp. 1601-1612.

Amir, S.; Wallace, B. C.; Lyu, H.; Carvalho, P.; Silva, M. J. Modelling Context with User Embeddings for Sarcasm Detection in Social Media. In Proceedings of the 20th SIGNLL Conference on Computational Natural Language Learning, Berlin, Germany, 11-12 Aug. 2016; pp. 167-177.

Hazarika, D.; Poria, S.; Gorantla, S.; Cambria, E.; Zimmermann, R.; Mihalcea, R. CASCADE: Contextual Sarcasm Detection in Online Discussion Forums. In Proceedings of the 27th International Conference on Computational Linguistics, Santa Fe, NM, USA, 20-26 Aug. 2018; pp. 1837-1848.

Rajadesingan, A.; Zafarani, R.; Liu, H. Sarcasm detection on twitter: A behavioral modeling approach. In Proceedings of the Eighth ACM International Conference on Web Search and Data Mining, Shanghai, China, 2-6 Feb. 2015; pp. 97-106.

Zhang, M.; Zhang, Y.; Fu, G. Tweet sarcasm detection using deep neural network. In Proceedings of the COLING 2016, The 26th International Conference on Computational Linguistics: Technical Papers, Osaka, Japan, 11-16 Dec. 2016; pp. 2449-2460.

Ptáček, T.; Habernal, I.; Hong, J. Sarcasm detection on czech and english twitter. In Proceedings of the COLING 2014, the 25th International Conference on Computational Linguistics: Technical Papers, Dublin, Ireland, 23-29 Aug. 2014; pp. 213-223.

Wang, Z.; Wu, Z.; Wang, R.; Ren, Y. Twitter sarcasm detection exploiting a context-based model. In Proceedings of the International Conference on Web Information Systems Engineering; Springer: Berlin/Heidelberg, Germany, 2015; pp. 77-91.

Joshi, A.; Tripathi, V.; Bhattacharyya, P.; Carman, M. Harnessing sequence labeling for sarcasm detection in dialogue from tv series 'friends'. In Proceedings of the 20th SIGNLL Conference on Computational Natural Language Learning, Berlin, Germany, 11-12 Aug. 2016; pp. 146-155.

Ghosh, A.; Veale, T. Fracking sarcasm using neural network. In Proceedings of the 7th Workshop on Computational Approaches to Subjectivity, Sentiment and Social Media Analysis; Association for Computational Linguistics: San Diego, CA, USA, 2016; pp. 161-169.

Vaswani, A.; Shazeer, N.; Parmar, N.; Uszkoreit, J.; Jones, L.; Gomez, A.N.; Kaiser, L.; Polosukhin, I. Attention is all you need. In Proceedings of the Advances in Neural Information Processing Systems, Long Beach, CA, USA, 4-9 Dec. 2017; pp. 5998-6008.

Wolf, T.; Debut, L.; Sanh, V.; Chaumond, J.; Delangue, C.; Moi, A.; Cistac, P.; Rault, T.; Louf, R.; Funtowicz, M.; et al. In Proceedings of the HuggingFace's Transformers: State-of-the-art Natural Language Processing. arXiv 2019, arXiv:1910.03771.

Mikolov, T.; Chen, K.; Corrado, G.; Dean, J. Efficient estimation of word representations in vector space. arXiv 2013, arXiv:1301.3781.

Mikolov, T.; Sutskever, I.; Chen, K.; Corrado, G. S.; Dean, J. Distributed representations of words and phrases and their compositionality. In Proceedings of the Advances in Neural Information Processing Systems, Lake Tahoe, NV, USA, 5-10 Dec. 2013; pp. 3111-3119.

Pennington, J.; Socher, R.; Manning, C. Glove: Global vectors for word representation. In Proceedings of the 2014 Conference on EMNLP, Doha, Qatar, 25-29 Oct. 2014; pp. 1532-1543.

Joulin, A.; Grave, E.; Bojanowski, P.; Mikolov, T. Bag of Tricks for Efficient Text Classification. In Proceedings of the 15th Conference of the European Chapter of the ACL, Valencia, Spain, 3-7 Apr. 2017; pp. 427-431.

Peters, M. E.; Neumann, M.; Iyyer, M.; Gardner, M.; Clark, C.; Lee, K.; Zettlemoyer, L. Deep contextualized word representations. In Proceedings of the NAACL-HLT, New Orleans, LA, USA, 1-6 Jun. 2018; pp. 2227-2237.

Devlin, J.; Chang, M. W.; Lee, K.; Toutanova, K. BERT: Pre-training of Deep Bidirectional Transformers for Language Understanding. In Proceedings of the 2019 Conference of NAACL: Human Language Technologies, Minneapolis, MN, USA, 2-7 Jun. 2019; pp. 4171-4186.

Zhou, B.; Khosla, A.; Lapedriza, A.; Oliva, A.; Torralba, A. Learning deep features for discriminative localization. In Proceedings of the IEEE Conference on Computer Vision and Pattern Recognition, Las Vegas, NV, USA, 27-30 Jun. 2016; pp. 2921-2929.

Selvaraju, R. R.; Cogswell, M.; Das, A.; Vedantam, R.; Parikh, D.; Batra, D. Grad-cam: Visual explanations from deep networks via gradient-based localization. In Proceedings of the IEEE International Conference on Computer Vision, Venice, Italy, 22-29 Oct. 2017; pp. 618-626.

Oraby, S.; Harrison, V.; Reed, L.; Hernandez, E.; Riloff, E.; Walker, M. Creating and Characterizing a Diverse Corpus of Sarcasm in Dialogue. In Proceedings of the 17th Annual Meeting of the Special Interest Group on Discourse and Dialogue, Los Angeles, CA, USA, 13-15 Sep. 2016; pp. 31-41.

Walker, M. A.; Tree, J. E. F.; Anand, P.; Abbott, R.; King, J. A Corpus for Research on Deliberation and Debate. In Proceedings of the LREC, Istanbul, Turkey, 23-25 May 2012; pp. 812-817.

Khodak, M.; Saunshi, N.; Vodrahalli, K. A Large Self-Annotated Corpus for Sarcasm. In Proceedings of the Eleventh International Conference on Language Resources and Evaluation (LREC 2018), Miyazaki, Japan, 7-12 May 2018.

Misra, R.; Arora, P. Sarcasm Detection using Hybrid Neural Network. arXiv 2019, arXiv:1908.07414.

Paszke, A.; Gross, S.; Massa, F.; Lerer, A.; Bradbury, J.; Chanan, G.; Killeen, T.; Lin, Z.; Gimelshein, N.; Antiga, L.; et al. PyTorch: An Imperative Style, High-Performance Deep Learning Library. In Proceedings of the Advances in Neural Information Processing Systems 32, Vancouver, BC, Canada, 8-14 Dec. 2019.

Farías, D. I. H.; Patti, V.; Rosso, P. Irony detection in twitter: The role of affective content. In Proceedings of the ACM Transactions on Internet Technology (TOIT); Association for Computing Machinery: New York, NY, USA, 2016; pp. 1-24.

Tay, Y.; Luu, A. T.; Hui, S. C.; Su, J. Reasoning with Sarcasm by Reading In-Between. In Proceedings of the 56th Annual Meeting of the ACL, Melbourne, Australia, 15-20 Jul. 2018; pp. 1010-1020.

Clark, K.; Khandelwal, U.; Levy, O.; Manning, C. D. What Does BERT Look at? An Analysis of BERT's Attention. In Proceedings of the 2019 ACL Workshop BlackboxNLP: Analyzing and Interpreting Neural Networks for NLP, Florence, Italy, 1 Aug. 2019; pp. 276-286.

All referenced publications are incorporated herein by reference in their entirety, to the same extent as if each were incorporated by reference individually. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method of automatically predicting a tone of a batch of text of an application associated with a computing device, the method comprising the steps of:
 loading, into a memory of the computing device, the application;
 receiving, via the application of the computing device, the batch of text;

converting, via a processor of the computing device, the batch of text into at least one aspect embedding;

transmitting, via the processor of the computing device, the at least one aspect embedding to at least one multi-head self-attention module, the at least one multi-head self-attention module comprising a tokenizer, wherein the tokenizer is configured to transform the at least one aspect embedding into at least one dimensional embedding;

computing at least one self-attention value, via the at least one multi-head self-attention module, wherein the at least one multi-head self-attention module is configured to associate at least one dimensional embedding with sarcasm;

transmitting, via the processor of the computing device, the at least one self-attention value to a gated recurrent unit ("GRU"), wherein the GRU is configured to compute a sarcasm output from the at least one self-attention value;

transmitting, via the processor of the computing device, the sarcasm output to a classification module, wherein the classification module is configured to compute an initial tone prediction from the sarcasm output;

comparing, via the classification module, the initial tone prediction with a ground-truth label; and automatically displaying the tone of the batch of text on a display device associated with the computing device by:

based on a determination that the initial tone prediction does not match with the ground-truth label, generating a notification indicative of sarcasm within the batch of text; and based on a determination that the initial tone prediction matches the ground- truth label, generating a notification indicative of no sarcasm within the batch of text.

2. The method of claim 1, further including the step of, after automatically displaying the tone of the batch of text on the display device associated with the computing device, displaying the batch of text with at least one aspect embedding indicative of sarcasm highlighted.

3. The method of claim 2, wherein the highlight on the at least one aspect embedding indicative of sarcasm is darker than the at least one alternative aspect embedding within the batch of text.

4. The method of claim 1, further including the step of, after automatically displaying the tone of the batch of text on the display device associated with the computing device, receiving an instruction to unload, from the memory of the computing device, the batch of text.

5. The method of claim 4, wherein the step of automatically displaying tone of the batch of text on the display device associated with the computing device, further includes the step of, after receiving the instruction to unload the batch of text, receiving at least one alternative batch of text, via the application.

6. The method of claim 1, wherein the application is a social media program.

7. The method of claim 1, further including the step of, after receiving the batch of text, selecting the at least one aspect embedding from the group consisting of "just," "again," "totally," and exclamation points.

8. A tone analysis optimization system for automatically displaying a tone of a batch of text of an application associated with a computing device, the tone analysis optimization system comprising:

the computing device having a processor; and a non-transitory computer-readable medium operably coupled to the processor, the computer-readable medium having computer-readable instructions stored thereon that, when executed by the processor, cause the tone analysis optimization system to automatically display the tone of a batch of text of the application associated with the computing device by executing instructions comprising:

loading, into a memory of the computing device, the application;

receiving, via the application of the computing device, the batch of text;

converting, via a processor of the computing device, the batch of text into at least one aspect embedding;

transmitting, via the processor of the computing device, the at least one aspect embedding to at least one multi-head self-attention module, the at least one multi-head self-attention module comprising a tokenizer, wherein the tokenizer is configured to transform the at least one aspect embedding into at least one dimensional embedding;

computing at least one self-attention value, via the at least one multi-head self-attention module, wherein the at least one multi-head self-attention module is configured to associate at least one dimensional embedding with sarcasm;

transmitting, via the processor of the computing device, the at least one self-attention value to a gated recurrent unit ("GRU"), wherein the GRU is configured to compute a sarcasm output from the at least one self-attention value;

transmitting, via the processor of the computing device, the sarcasm output to a classification module, wherein the classification module is configured to compute an initial tone prediction from the sarcasm output;

comparing, via the classification module, the initial tone prediction with a ground-truth label; and automatically displaying the tone of the batch of text on a display device associated with the computing device by:

based on a determination that the initial tone prediction does not match with the ground-truth label, generating a notification indicative of sarcasm within the batch of text; and based on a determination that the initial tone prediction matches the ground-truth label, generating a notification indicative of no sarcasm within the batch of text.

9. The tone analysis optimization system of claim 8, wherein the executed instructions further comprise, after automatically displaying the tone of the batch of text on the display device associated with the computing device, displaying the batch of text with at least one aspect embedding indicative of sarcasm highlighted.

10. The tone analysis optimization system of claim 9, wherein the highlight on the at least one aspect embedding indicative of sarcasm is darker than the at least one alternative aspect embedding within the batch of text.

11. The tone analysis optimization system of claim 8, wherein the executed instructions further comprise, after automatically displaying the tone of the batch of text on the display device associated with the computing device, receiving an instruction to unload, from the memory of the computing device, the batch of text.

12. The tone analysis optimization system of claim 11, wherein the executed instructions further include, after automatically displaying the tone of the batch of text and receiving the instruction to unload the batch of text, receiving at least one alternative batch of text, via the application.

13. The tone analysis optimization system of claim 8, wherein the application is a social media program.

14. The tone analysis optimization system of claim 8, wherein the executed instructions further include, after receiving the batch of text, selecting the at least one aspect embedding from the group consisting of "just," "again," "totally," and exclamation points.

15. A method of automatically determining a tone of a batch of text of an application associated with a computing device, the method comprising the steps of:
- loading, into a memory of the computing device, the application;
- receiving, via the application of the computing device, the batch of text;
- converting, via a processor of the computing device, the batch of text into at least one aspect embedding;
- transmitting, via the processor of the computing device, the at least one aspect embedding to at least one multi-head self-attention module, the at least one multi-head self-attention module comprising a tokenizer, wherein the tokenizer is configured to transform the at least one aspect embedding into at least one dimensional embedding;
- computing at least one self-attention value, via the at least one multi-head self-attention module, wherein the at least one multi-head self-attention module is configured to associate at least one dimensional embedding with sarcasm;
- transmitting, via the processor of the computing device, the at least one self-attention value to a gated recurrent unit ("GRU"), wherein the GRU is configured to compute a sarcasm output from the at least one self-attention value;
- transmitting, via the processor of the computing device, the sarcasm output to a classification module, wherein the classification module is configured to compute an initial tone prediction from the sarcasm output;
- comparing, via the classification module, the initial tone prediction with a ground-truth label; and
- automatically displaying the tone of the batch of text on a display device associated with the computing device by:
  - based on a determination that the initial tone prediction does not match with the ground-truth label, generating a notification indicative of sarcasm within the batch of text; and
  - based on a determination that the initial tone prediction matches the ground-truth label, generating a notification indicative of no sarcasm within the batch of text.

16. The method of claim 15, wherein the application is a social media program.

17. The method of claim 15, further including the step of, after receiving the batch of text, selecting the at least one aspect embedding from the group consisting of "just," "again," "totally," and exclamation points.

18. The method of claim 15, further including the steps of:
- after automatically displaying the tone of the batch of text on the display device associated with the computing device, receiving an instruction to unload, from the memory of the computing device, the batch of text;
- based on a determination that the initial tone prediction does not match with the ground-truth label, after receiving the instruction to unload the batch of text, receiving at least one alternative batch of text, via the application; and
- based on a determination that the initial tone prediction matches the ground-truth label, after receiving the instruction to unload the batch of text, receiving at least one alternative batch of text, via the application.

19. The method of claim 15, further including the step of, after automatically displaying the tone of the batch of text on the display device associated with the computing device, displaying the batch of text with at least one aspect embedding indicative of sarcasm highlighted.

20. The method of claim 19, wherein the highlight on the at least one aspect embedding indicative of sarcasm is darker than the at least one alternative aspect embedding within the batch of text.

* * * * *